(12) United States Patent
Nathella et al.

(10) Patent No.: US 10,817,426 B2
(45) Date of Patent: Oct. 27, 2020

(54) PREFETCHING TECHNIQUES

(71) Applicant: Arm Limited, Cambridge (GB)

(72) Inventors: Krishnendra Nathella, Austin, TX (US); Chris Abernathy, Austin, TX (US); Huzefa Moiz Sanjeliwala, Austin, TX (US); Dam Sunwoo, Austin, TX (US); Balaji Vijayan, Austin, TX (US)

(73) Assignee: Arm Limited, Cambridge (GB)

( * ) Notice: Subject to any disclaimer, the term of this patent is extended or adjusted under 35 U.S.C. 154(b) by 103 days.

(21) Appl. No.: 16/139,160

(22) Filed: Sep. 24, 2018

(65) Prior Publication Data

US 2020/0097409 A1 Mar. 26, 2020

(51) Int. Cl.
*G06F 12/0862* (2016.01)
*G06F 9/30* (2018.01)

(52) U.S. Cl.
CPC ...... *G06F 12/0862* (2013.01); *G06F 9/30043* (2013.01); *G06F 2212/6026* (2013.01)

(58) Field of Classification Search
CPC ............. G06F 12/0862; G06F 9/30043; G06F 221/6026
See application file for complete search history.

(56) References Cited

U.S. PATENT DOCUMENTS

| | | | | |
|---|---|---|---|---|
| 6,571,318 B1 * | 5/2003 | Sander | ................ | G06F 12/0862 711/137 |
| 6,976,147 B1 * | 12/2005 | Isaac | ................... | G06F 12/0862 711/137 |
| 7,487,296 B1 * | 2/2009 | Iacobovici | .......... | G06F 12/0862 711/137 |
| 9,442,801 B2 * | 9/2016 | Benedict | ............... | G06F 11/106 |
| 10,331,567 B1 * | 6/2019 | Meier | ................. | G06F 12/0862 |
| 2003/0084433 A1 * | 5/2003 | Luk | ........................ | G06F 8/4442 717/158 |
| 2003/0126591 A1 * | 7/2003 | Wu | ....................... | G06F 8/4442 717/158 |
| 2003/0204840 A1 * | 10/2003 | Wu | ..................... | G06F 11/3612 717/158 |

(Continued)

OTHER PUBLICATIONS

Pierre Michaud, "A Best-Offset Prefetcher", 2nd Data Prefetching Championship, Jun. 2015, 6 pages.

*Primary Examiner* — Ramon A. Mercado
(74) *Attorney, Agent, or Firm* — Nixon & Vanderhye P.C.

(57) ABSTRACT

A variety of data processing apparatuses are provided in which stride determination circuitry determines a stride value as a difference between a current address and a previously received address. Stride storage circuitry stores an association between stride values determined by the stride determination circuitry and a frequency during a training period. Prefetch circuitry causes a further data value to be proactively retrieved from a further address. The further address is the current address modified by a stride value in the stride storage circuitry having a highest frequency during the training period. The variety of data processing apparatuses are directed towards improving efficiency by variously disregarding certain candidate stride values, considering additional further addresses for prefetching by using multiple stride values, using feedback to adjust the training process and compensating for page table boundaries.

13 Claims, 10 Drawing Sheets

(56) References Cited

U.S. PATENT DOCUMENTS

| | | | |
|---|---|---|---|
| 2005/0149915 A1* | 7/2005 | Wu | G06F 9/45516 |
| | | | 717/137 |
| 2007/0150660 A1* | 6/2007 | Marathe | G06F 12/0862 |
| | | | 711/137 |
| 2009/0216956 A1* | 8/2009 | Ekanadham | G06F 12/0862 |
| | | | 711/137 |
| 2011/0072218 A1* | 3/2011 | Manne | G06F 12/0862 |
| | | | 711/136 |
| 2013/0339617 A1* | 12/2013 | Averbouch | G06F 12/0862 |
| | | | 711/133 |
| 2014/0237212 A1* | 8/2014 | Garg | G06F 12/0215 |
| | | | 711/205 |
| 2014/0281232 A1* | 9/2014 | Hagersten | G06F 12/0862 |
| | | | 711/119 |
| 2016/0054997 A1* | 2/2016 | Radhakrishnan | G06F 12/0862 |
| | | | 711/137 |
| 2016/0239212 A1* | 8/2016 | Solihin | G06F 11/3037 |
| 2018/0018266 A1* | 1/2018 | Jones, III | G06F 12/0862 |
| 2018/0181402 A1* | 6/2018 | Zhang | G06F 9/3455 |
| 2018/0329823 A1* | 11/2018 | Brekelbaum | G06F 9/30043 |
| 2019/0065375 A1* | 2/2019 | Al Sheikh | G06F 12/0875 |
| 2019/0205135 A1* | 7/2019 | Nori | G06F 12/00 |

\* cited by examiner

PREFETCHING TECHNIQUES

TECHNICAL FIELD

The present disclosure relates to data storage. More particularly, it relates to prefetching techniques.

DESCRIPTION

Prefetching is a process where data, which is predicted as being needed, is proactively fetched from memory before an explicit request for that data is made. For instance, the prediction can operate ahead of data that is being explicitly requested as defined by a stride length. It is proposed that a training period could be used in order to monitor explicitly made requests so as to determine an appropriate stride length that would cover as many requests as possible.

SUMMARY

Viewed from a first example configuration, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency during a training period; prefetch circuitry to cause a further data value to be proactively retrieved from a further address, wherein the further address is the current address modified by a stride value in the stride storage circuitry having a highest frequency during the training period; and stride culling circuitry to remove at least some of the multiple stride values during the training period.

Viewed from a second example configuration, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency during a training period; and prefetch circuitry to cause further data values to be proactively retrieved from further addresses, wherein the further addresses are the current address modified by stride values in the stride storage circuitry having highest frequencies during the training period.

Viewed from a third example configuration, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency of occurrence during a training period; and prefetch circuitry to cause a further data value to be proactively retrieved from a further address, wherein the further address is the current address modified by a stride value in the stride storage circuitry having a highest frequency during the training period such that the further address and the current address are on a same page of memory circuitry.

Viewed from a fourth example configuration, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency of occurrence during a training period; prefetch circuitry to cause a further data value to be proactively retrieved from a further address, wherein the further address is the current address modified by a stride value in the stride storage circuitry having a highest frequency above a minimum frequency during the training period; and feedback circuitry to adjust at least one of the training period and the minimum frequency based on a performance of the stride value in the stride storage circuitry having the highest frequency above the minimum frequency during the training period.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
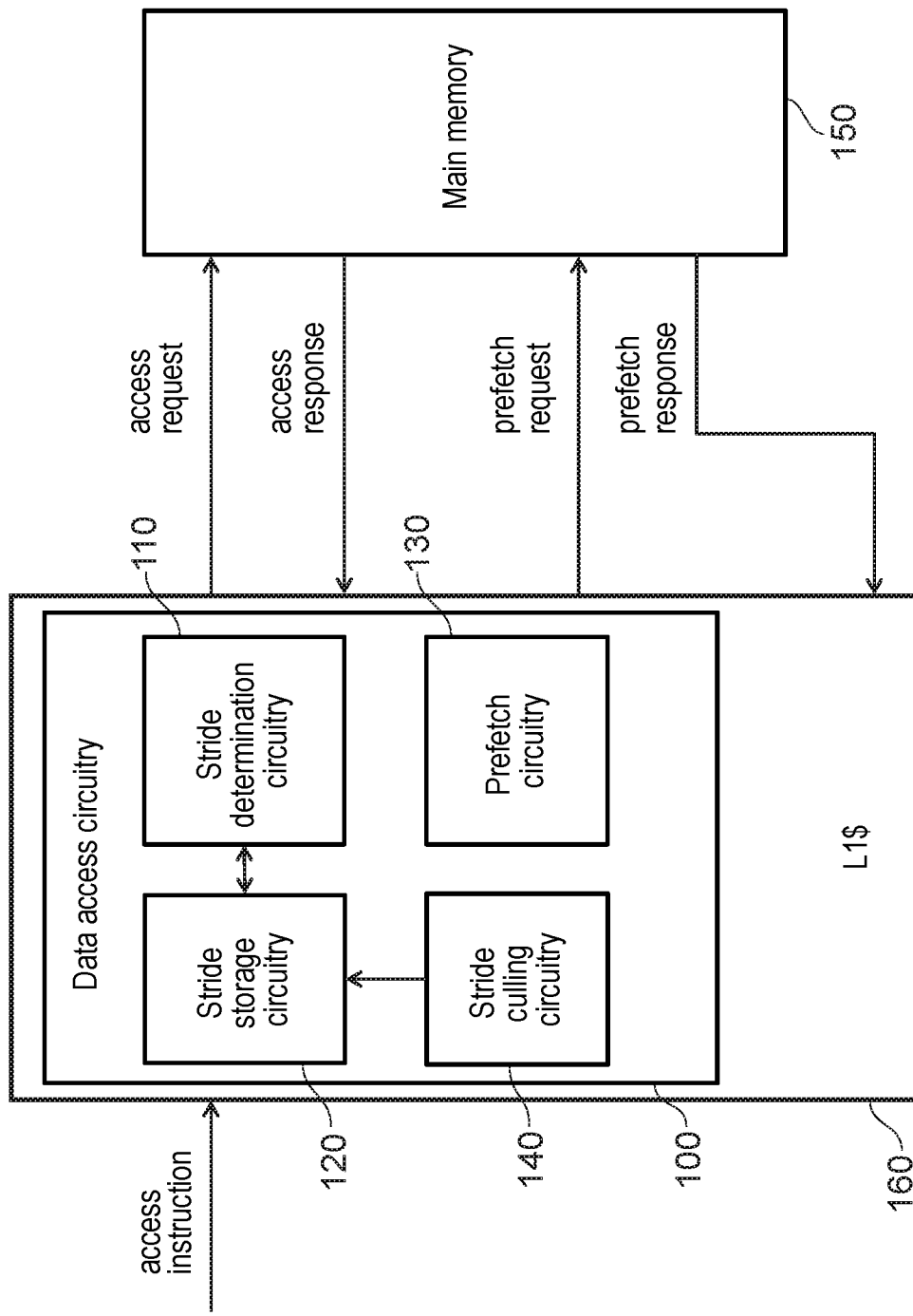
FIG. 1 schematically illustrates a data processing apparatus in accordance with some embodiments.

Before discussing the embodiments with reference to the accompanying figures, the following description of embodiments is provided.

In accordance with some embodiments, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency during a training period; prefetch circuitry to cause a further data value to be proactively retrieved from a further address, wherein the further address is the current address modified by a stride value in the stride storage circuitry having a highest frequency during the training period; and stride culling circuitry to remove at least some of the multiple stride values during the training period.

The storage circuitry could, for instance, be in the form of a main memory in a computing system. The data access circuitry maintains a list of previously accessed addresses for data that has been accessed either explicitly or proactively within a particular window (either defined by a period of time or a number of previous accesses). A list of candidate offsets (e.g. stride lengths) is also maintained, with each candidate being associated with a frequency (e.g. a score). In this way it is possible to test each candidate stride length (e.g. offset) to see if it would have or did trigger the received data to be proactively fetched as a result of a prefetch operation. If so, those candidate stride lengths have their frequency of occurrence increased. Thus, at the end of a training period, the set of candidate stride lengths can be examined and the candidate having the highest occurrence is selected. This represents the stride length that would have resulted in the most data being correctly prefetched. It will be appreciated that stride lengths could be positive or negative (but typically not zero). Having performed the training period, the selected candidate (the one having the highest frequency) is used for further prefetching operations. In the above embodiments, rather than maintain data regarding every candidate stride length, some of the candidates can be removed during the training period. In this way, the complexity and duration of the training period can be simplified.

In some embodiments, for each of the access instructions, one of the stride values is selected as a selected stride value; and the frequency is increased in response to the selected stride value matching the difference between the current address and the previously received address. In this way, rather than consider each candidate stride length for every item of received data, which could involve a large number of comparisons being made, a returned item of data is tested against candidate stride length n to see if that particular stride length would have caused the returned item of data to be accessed in view of the recent other accesses that have been made. The next access is then tested against candidate n+1, and so on.

In some embodiments, the at least some of the multiple stride values have an associated frequency below a minimum threshold based on how much of the training period remains. It therefore becomes easier for a candidate to be removed as time goes on—reflecting the fact that as the training period continues, certain candidates that are more or less likely to succeed are expected to emerge. Consequently, as the training process goes on, candidates that are unlikely to be selected as the final stride length for use in prefetching are more likely to be eliminated.

In some embodiments, the minimum threshold is a smallest value for which it is possible for the frequency of one of the stride values to become at least equal to the highest frequency during the training period. In this way the candidates that are eliminated are those where it is no longer possible for the candidate to become the winner. Since such candidates cannot become the selected winning offset, it makes sense to remove such candidates from consideration.

In some embodiments, the training period is terminated in response to the highest frequency reaching an upper limit. In such embodiments, it is not necessary to wait for the full training period to elapse if, for instance, a clear winning candidate quickly emerges. In these cases, rather than complete the full training period, a candidate that reaches the upper limit is immediately selected, thereby improving the efficiency of the training process.

In accordance with some embodiments, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency during a training period; and prefetch circuitry to cause further data values to be proactively retrieved from further addresses, wherein the further addresses are the current address modified by stride values in the stride storage circuitry having highest frequencies during the training period.

Rather than picking on a single winner from the previously performed training period, a number of winning candidates can be selected. Prefetching can then take place on the basis of multiple winning candidates rather than only one. For instance, in some embodiments a highest and a second highest candidate are selected for future prefetching to take place, and both stride values are used in future prefetching operations. This can help to avoid the situation in which a good (but not best) candidate is 'lost' due to another good candidate being selected, even though both candidates could simultaneously be valid and result in the collection of different sets of data (in the case of, for instance, multiple processes simultaneously fetching data).

In accordance with some embodiments, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency of occurrence during a training period; and prefetch circuitry to cause a further data value to be proactively retrieved from a further address, wherein the further address is the current address modified by a stride value in the stride storage circuitry having a highest frequency during the training period such that the further address and the current address are on a same page of memory circuitry.

Physical addresses relate to locations in the hardware where data is physically stored. These differ from virtual addresses that might provide an expanded address space in order to use techniques such as virtual memory, where memory can be paged out to disk, or to provide access permissions where different processes can be given different permissions in respect of the same area of physical memory. Other techniques can also be implemented. Virtual to physical address translation is such that two neighbouring virtual addresses could actually be on different pages of physical memory. The prefetching process may operate on physical addresses rather than virtual addresses. This could cause prefetching to occur across page boundaries, which can be slow due to the need for different parts of memory to be accessed. In the above embodiments, therefore, if it is determined that a selected stride length would result in a prefetch operation crossing a page boundary in memory then a different candidate is selected so as to avoid prefetching across a page boundary.

In some embodiments, the stride values are bound by a lower stride value and an upper stride value; and when the further address and the current address are on different pages of the memory circuitry, at least one of: a magnitude of the lower stride value and a magnitude of the upper stride value is reduced and then the stride value in the stride storage circuitry having the highest frequency during the training period is redetermined. The lower stride value and the upper stride value could be powers of two in magnitude and could be negative and positive respectively. All the candidates stride lengths that are under consideration are therefore bound by these limits. In response to the prefetch causing the access of data that is on a different page, at least one of these limits is brought closer to the midpoint (e.g. 0) thereby causing a reselection of candidate to occur, while removing the ability for the same candidate (or one that is worse for causing a page boundary cross to occur) to be selected.

In some embodiments, both the magnitude of the lower stride value and the magnitude of the upper stride value are reduced. Consequently, if prefetching with the selected candidate is identified as potentially causing memory pages to be crossed then the maximum magnitude of candidate stride length is reduced and the selected candidate can be reselected. Thus, the page boundary cross could be avoided altogether or the likelihood of that page boundary cross occurring can be lessened.

In some embodiments, when the further address and the current address are on different pages and when the further address is higher than the current address, the magnitude of the upper stride value is reduced; and when the further address and the current address are on different pages and when the further address is lower than the current address, the magnitude of the lower stride value is reduced. A previously computed alternative offset can then be selected based on the revised upper and lower stride values.

In some embodiments, the at least one of: a magnitude of the lower stride value and a magnitude of the upper stride value is reduced to either 0 or 1. An alternative offset value can then be selected based on the previous training process. In this way, prefetching can be limited to accessing memory in a particular direction, e.g. away from the page boundary or can be lessened to such an extent that a cross of the page boundary is unlikely to occur (if, for instance, the magnitude is '1').

In some embodiments, the at least one of: the magnitude of the lower stride value and the magnitude of the upper stride value is reduced by a half. If a candidate is selected due to having a high occurrence, then this could occur as a result of divisors of that candidate also having high scores. Thus, by dividing the upper and/or lower stride values by a two (e.g. by halving them), high scoring divisors of the previous candidate can be located. If the score associated with such divisors is high enough, those candidate stride lengths could then be selected to perform prefetching with. For instance, if the bounds are +64 and −64, then winning candidate could be 44. This is more likely to be true if other detected patterns include 22, and 11. Hence, by dividing the bounds by two (to +32 and −32) high scoring divisors such as 22 and 11 can be detected. Furthermore, since the divisors are smaller than the previous bounds (which have been divided by two) there is less likely the page boundary crossing will occur when such a candidate is selected.

In some embodiments, while the further address and the current address are on different pages of the memory circuitry, at least one the magnitude of the lower stride value and the magnitude of the upper stride value is reduced and then the stride value in the stride storage circuitry having the highest frequency during the training period is redetermined. In this way, the process of selecting the stride value from the candidates can be iterative. If the process of prefetching with the selected candidate would result in a page boundary being immediately crossed, then the candidates are recalculated using the adjusted boundaries. If the adjusted boundaries are such that the newly selected candidate would still cause a page boundary to be crossed as a result of prefetching then the boundaries are adjusted again and a candidate is determined again.

In accordance with some embodiments, there is provided a data processing apparatus comprising: data access circuitry to access data values in storage circuitry at addresses specified by access instructions; stride determination circuitry to determine a stride value as a difference between a current address and a previously received address; stride storage circuitry to store an association between stride values determined by the stride determination circuitry and a frequency of occurrence during a training period; prefetch circuitry to cause a further data value to be proactively retrieved from a further address, wherein the further address is the current address modified by a stride value in the stride storage circuitry having a highest frequency above a minimum frequency during the training period; and feedback circuitry to adjust at least one of: the training period, the minimum frequency, and an early termination value based on a performance of the stride value in the stride storage circuitry having the highest frequency above the minimum frequency during the training period.

In the above embodiments, a feedback mechanism is provided in order to determine the performance of the selected stride value after it has been selected in a previous training period. In particular, if the selected stride value (e.g. offset) performs particularly well, then this suggests that the training period can be reduced in the future thereby causing a candidate to be selected more quickly and efficiently (and vice-versa).

There are a number of ways in which performance can be measured. However, in some embodiments the performance is based on a number of hits that occur by using the stride value in the stride storage circuitry having the highest frequency above the minimum frequency during the training period. Thus, the performance can be based on the number of hits that the selected candidate achieves. This could be as a ratio (hits/attempts), for instance. A larger number of hits (or a larger ratio) is indicative of a better performing candidate, since it indicates that prefetching is working correctly.

In some embodiments, when the performance is below a lower threshold, the training period is increased; and when the performance is above an upper threshold, the training period is decreased. In this way, when the performance is below the lower threshold (indicating that the performance is below a given level), the training period is increased so that a longer period of time is given for a candidate to become established. In contrast, when the performance is above the upper threshold (indicating that the performance is above a given level), the training period is decreased so that a decision of which candidate to select is made more quickly and efficiently in the future.

In some embodiments, the training period is defined by a number of access instructions being received; the number of access instructions is equal to a number of rounds multiplied by the number of stride values in the stride storage circuitry; and the number of rounds is adjusted in dependence on the performance. During one round, each of the candidate stride values is tested once. For instance, in a first test of a first round, the first candidate stride value is tested. In a second test of the first round, the second candidate stride value is tested, and so on. The length of the training period is dependent on the number of access instructions to be issued, which depends on the number of candidates and the number of rounds. Thus, by adjusting the number of rounds based on the performance, the length of the training period can be adjusted. In some other embodiments, the training period is defined by a number of demand misses and demand hits that hit on a line that was prefetched earlier.

In some embodiments, the training period is defined by the highest frequency exceeding the early termination value. The early termination value can be selected so that if a particular candidate's frequency of occurrence reaches the early termination value during the training period, the training period is ended and that candidate is selected. This helps to avoid a situation in which it becomes clearly from an early stage whether one of the candidates is highly likely to be selected and the training unnecessarily continues.

In some embodiments, the minimum frequency is adjusted in dependence on the performance; when the performance is below a lower threshold, the minimum frequency is increased; and when the performance is above an upper threshold, the minimum frequency is decreased. The minimum frequency is the frequency above which a candidate must reach during the training period to be considered for selection. Candidate stride lengths with frequencies below this limit are considered to be too infrequent to have a beneficial effect when selected as the stride length. Thus, if the performance of the selected stride length ends up being below a lower threshold then the minimum frequency can be increased to inhibit the selection of poor quality candidates in the future. Similarly, if the performance is above an upper threshold, then the minimum frequency can be decreased in order to potentially allow other candidates to be selected.

In some embodiments, the at least one of the training period and the minimum frequency is adjusted to one of a number of discrete values. In such embodiments, there is no need for the minimum frequency and/or the training period to be calculated. Instead, these can be set to one of several previously determined levels or values.

Particular embodiments will now be described with reference to the figures.

FIG. 1 illustrates a data processing apparatus in the form of data access circuitry 100 in accordance with some embodiments. The data access circuitry 100 receives access instruction and issues access requests to a storage circuit such as a main memory 150. The access instruction includes an address in the main memory 150 and the access request then causes that location in the main memory 150 to be either written to or loaded from. An access response can be issued by the main memory 150 back to the data access circuitry 100 in order to either return the requested data or to indicate whether the storage of the data at the requested location in the main memory 150 was successful. The data access circuitry 100 also includes prefetch circuitry 130. The prefetch circuitry 130 causes an access request to be issued the main memory 150 proactively, e.g. without an explicit read access instruction to that data having been issued to the data access circuitry 100. The prefetch request that is issued by the prefetch circuitry 130 loads the requested data into a cache such a first level cache 160. In this way, when a subsequent explicit request for that data is received by the data access circuitry 100, it can be accessed from the level one cache 160 quickly rather than having to issue an access request to the main memory 150 and wait for an access response to be issued back. Consequently, the requested data can be accessed more quickly. The data that is accessed by the prefetched circuitry 130 is accessed some period ahead of a time when it is predicted that that data will be required. This period is known as a stride length (or offset) and could for instance represent a difference in memory locations between locations currently explicitly being requested at the data access circuitry 100 and a location of the data being prefetched by the prefetch circuitry 130 in the data access circuitry 100.

In the above embodiments, a number of different candidates for a stride length are considered during a training period. These are stored in stride storage circuitry 120. As data is returned to the data access circuitry 100 as a result of explicit read requests or prefetch requests issued by the prefetch circuitry 130, the stride determination circuitry 110 matches the address of the returned data against recent requests that have been issued by the data access circuitry 100 to the main memory 150. In this way, a set of hypothetical stride lengths can be determined. These are then matched against one of the candidates in the stride storage circuitry. If there is a match, then the score or frequency associated with that candidate stride in the stride storage circuitry 120 is incremented. Otherwise, no action is taken. The candidate in the stride storage circuitry is changed for each incoming access request. In this way, over a period of time, it is determined which stride lengths could have resulted in each item of data being returned if prefetching with that candidate stride length has been enabled. This therefore reveals, over a period of time, which of the candidate stride lengths would be most efficient at correctly returning the requested data. Once the training period has completed, the candidate with the highest frequency is then selected as the stride length to be used by the prefetched circuitry 130 in the future. This could be replaced by a further training period if necessary.

In these embodiments, stride culling circuitry 140 is provided in order to cull some of the candidates from the stride storage circuitry. In this way, the number of candidates that must be considered can be reduced over time. Consequently, the training period can also be reduced.

Figure 2:
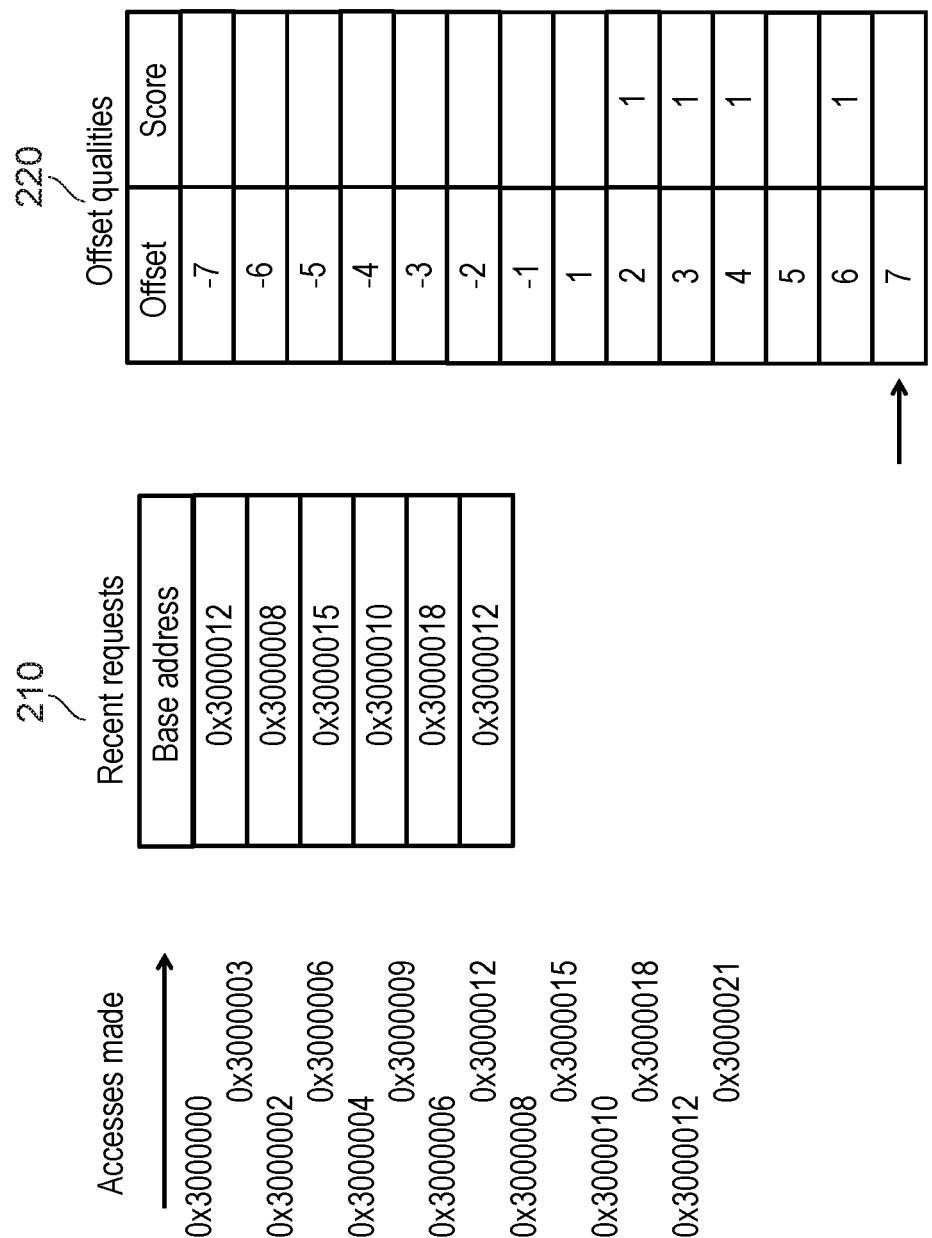
FIG. 2 illustrates how training can be carried out in order to determine a suitable stride length or offset for prefetching.

FIG. 2 shows an example of how the offset scores may be determined. A set of accesses are made to the main memory 150 by, for instance, data access circuitry 100. These accesses could be made as a consequence of explicit access instructions or as a result of prefetches made by, for instance, prefetch circuitry 130. The accesses are interleaved since, in this example, they are made as a consequence of two different processes accessing data. Each process accesses its data sequentially. In the case of a first process (shown in FIG. 2 as left-aligned memory addresses in the stream of addresses), each accessed address increments by two bytes in each access. In a second process (shown in FIG. 2 as right-aligned memory addresses in the stream of addresses), each access increases the address by three bytes. A window of the six most recent requests 210 is also kept. This indicates the address of each recently made access. A list of offset qualities 220 is also stored. In this example, the candidates range from −7 to +7. With each candidate, a score is kept. The score indicates the quality of using that offset as a stride length for prefetch circuitry 130. One of the candidates is considered for each access request. In this example, the access that has been made is to address 0x3000021. The candidate that is under consideration is the stride length +7. Consequently, each of the recent requests 210 is analysed to determine whether an offset of +7 would have caused an access to address 0x3000021 to have been made. Since none of the recent requests 210 is the address 0X3000014, there is no hit and consequently the score for the candidate +7 is untouched. In this example, the value +7 is an upper bound of the set of candidate offsets and consequently a new round then begins with the offset candidate −7.

In this example it can be easily seen that the two processes access memory addresses in jumps of two or three bytes. The Lowest Common Multiple (LCM) of two and three is six. Consequently, one might expect the score associated with the offset candidate six to increase over a number of rounds.

This is because if the offset six were to be used, then each of the accesses that are made after a period of time are made to addresses that could have been prefetched when using a stride length of six.

It will be appreciated that the number of accesses required for the training period relate to both the number of different candidates and the number of rounds that are to be used. In particular, the number of accesses to be made will generally be equal to the number of rounds multiplied by the number of candidates. As a consequence, if candidates can be removed, then the number of accesses to be made can be reduced and the training period can therefore also be reduced.

Note that in this example, the training occurs using all of the access requests that occur. However, in other embodiments, only a subset of the access requests may be considered. For instance, in some embodiments, training may occur based on explicit requests for data that miss and also on explicit requests for data that hit where the data was previously prefetched into the cache.

Bytes have been used in the above example to better illustrate the stride determination. However, in other embodiments, data accesses take place on a cache line basis.

Figure 3:
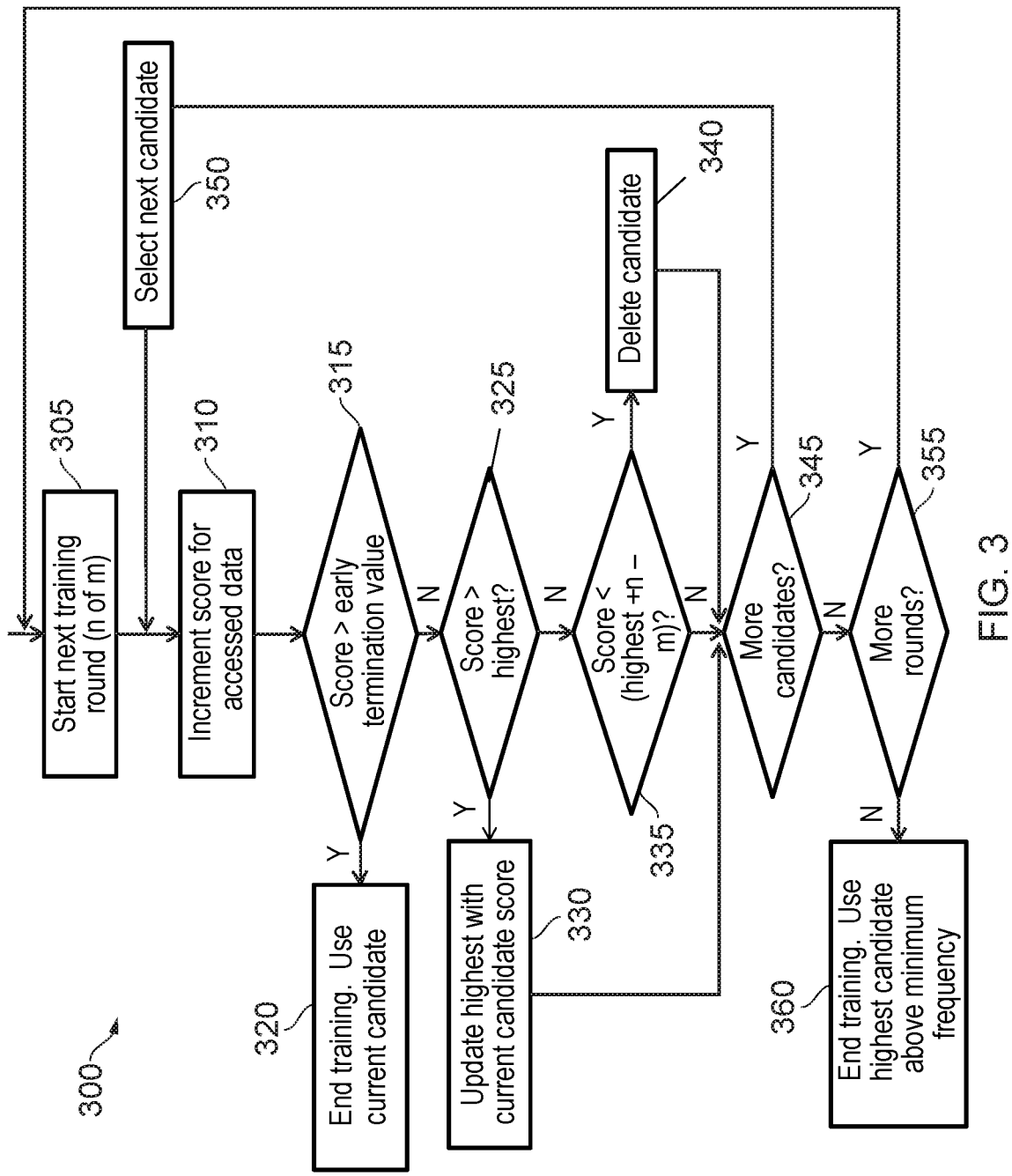
FIG. 3 shows, in flowchart form, a method of performing a training process in accordance with some embodiments.

FIG. 3 illustrates a flow chart that demonstrates how the candidates can be removed or culled from the stride storage circuitry over time. The process starts at a step 305 where a training round N of M is begun. At a step 310, the offset qualities 220 are incremented for the current candidate as appropriate, as discussed with reference to FIG. 2. At a step 315, it is determined whether a score associated with the current candidate is greater than an early termination value. The early termination value is a value beyond which a candidate having such a score will be immediately selected as the selected candidate regardless of further rounds of training that are to be carried out. Consequently, if the score of the current candidate is greater than the early termination value, then at step 320 the training is ended and the current selected candidate is used. Otherwise, at a step 325, it is determined whether the score of the current candidate is higher than the highest score that has been seen so far. If so, then at step 330, the highest score is updated to reflect the current candidate and the process proceeds to step 345. Otherwise, the process proceeds to step 335 where it is determined whether the current candidate should be culled or not. In particular, if the score of the current candidate is less than the highest score among all the candidates plus the round number (N) minus the number of rounds that are performed (M) then the process proceeds to step 340 where the candidate is deleted. The process proceeds to step 345 in any event. Effectively, at step 335 it is determined whether the score of the current candidate is sufficiently low that the candidate is incapable of becoming the highest score before the training is completed. If the score is sufficiently low then the candidate is disregarded since it cannot become the winning candidate. Accordingly, by removing the candidate from consideration, the overall training process can be completed more quickly as a consequence of fewer access requests having to be made for the training process to be completed. At a step 345, it is determined whether there are more candidates to be considered in the current round of training. If so, then at step 350, the next candidate is selected. The process then proceeds to step 310 where the scores are incremented in relation to the next access request for the newly selected candidate. If there are not more candidates, then at step 355 it is determined whether more rounds are to be completed. If so, then the process proceeds back to step 305 where the next training round is started (i.e. with N being incremented by 1). If there are not more rounds to be completed at step 355, then at step 360 the training process ends. The candidate having the highest score above a minimum frequency is then selected. The minimum frequency is selected such that candidates that are particularly poor are not selected as the winners merely because they are the highest performing candidate.

In this way, it can be seen how those candidates that are incapable of becoming the winner from the training period removed from the training process. Consequently, the number of accesses that must take place in order for one of the candidates to be selected can be reduced since the remaining candidates can be considered more quickly. Fewer accesses are therefore required for the training process to be completed and consequently the training process can be completed more efficiently.

Figure 4:
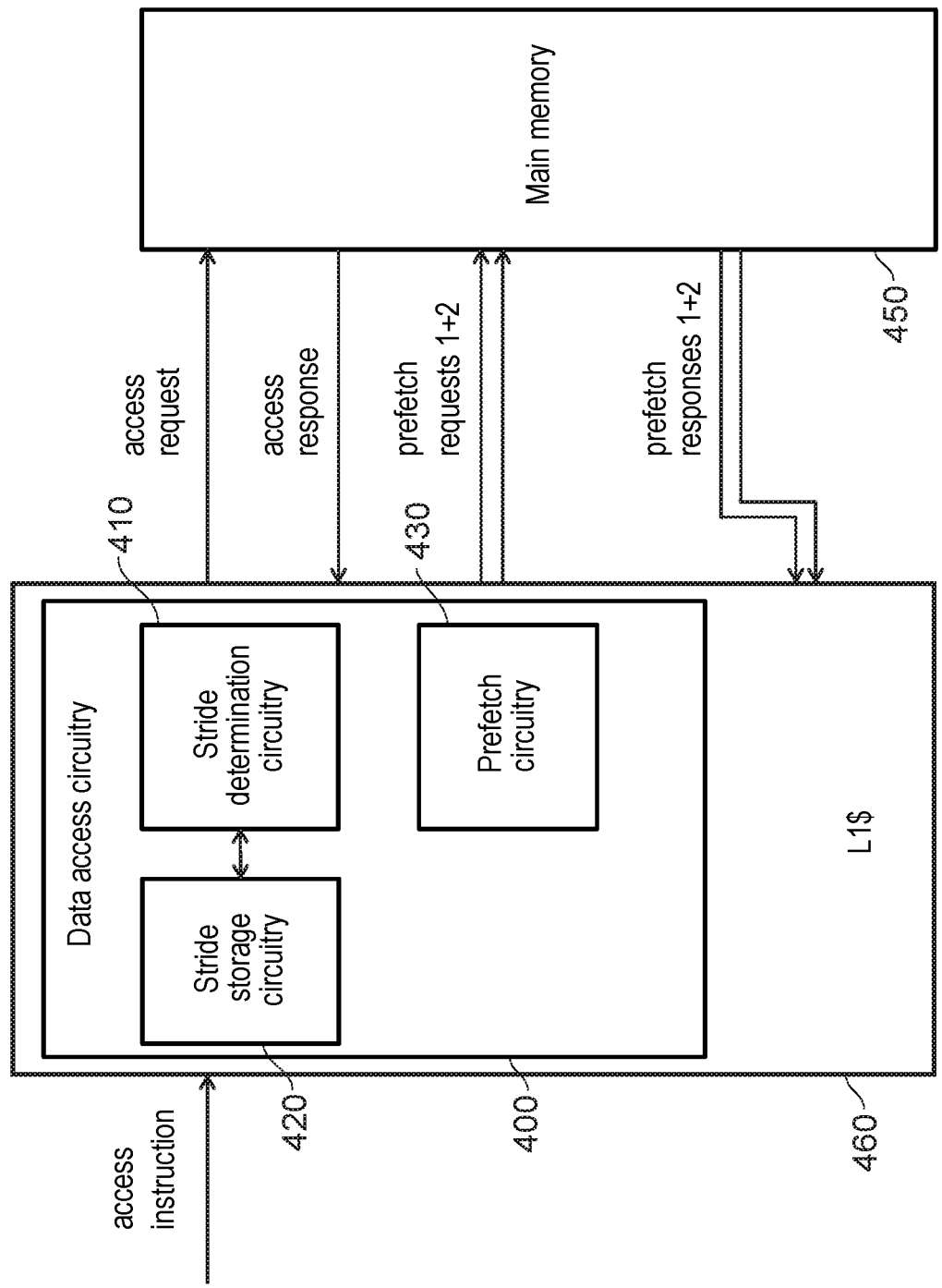
FIG. 4 schematically illustrates a data processing apparatus in accordance with some embodiments.

FIG. 4 schematically illustrates a data processing apparatus 400 in the form of data access circuitry 400 in accordance with some embodiments. In these embodiments, the stride values are calculated as previously described (with or without the use of stride culling circuitry 140 to remove candidates from consideration during the training period). However, having determined the scores for each of the candidates during a training period, prefetches are sent on the basis of a plurality of winners rather than simply the highest performing candidate that is over a minimum frequency. This is illustrated in FIG. 4 by prefetch requests 1 and 2 being issued from the data access circuitry 400 by virtue of the prefetch circuitry 430 and the corresponding prefetch responses 1 and 2 being sent back to the level 1 cache 460. In this example, the prefetch requests 1 and 2 could be based on an address that is calculated from a current address of an explicitly made access instruction and the two highest performing stride lengths in the stride storage circuitry 420 that are above a minimum value. In some embodiments, a prefetch request may be sent out for every candidate stride length that is above a minimum value. In other embodiments, only a subset of the winners (such as those that are the highest performers) are used to send out prefetch requests. In this way, if the series of accesses can only be expressed as a consequence of using two different stride lengths, then the issuing of two prefetch requests can result in more data being correctly prefetched by the prefetch circuitry 430 than if only a single prefetch or single stride length were used.

Figure 5:
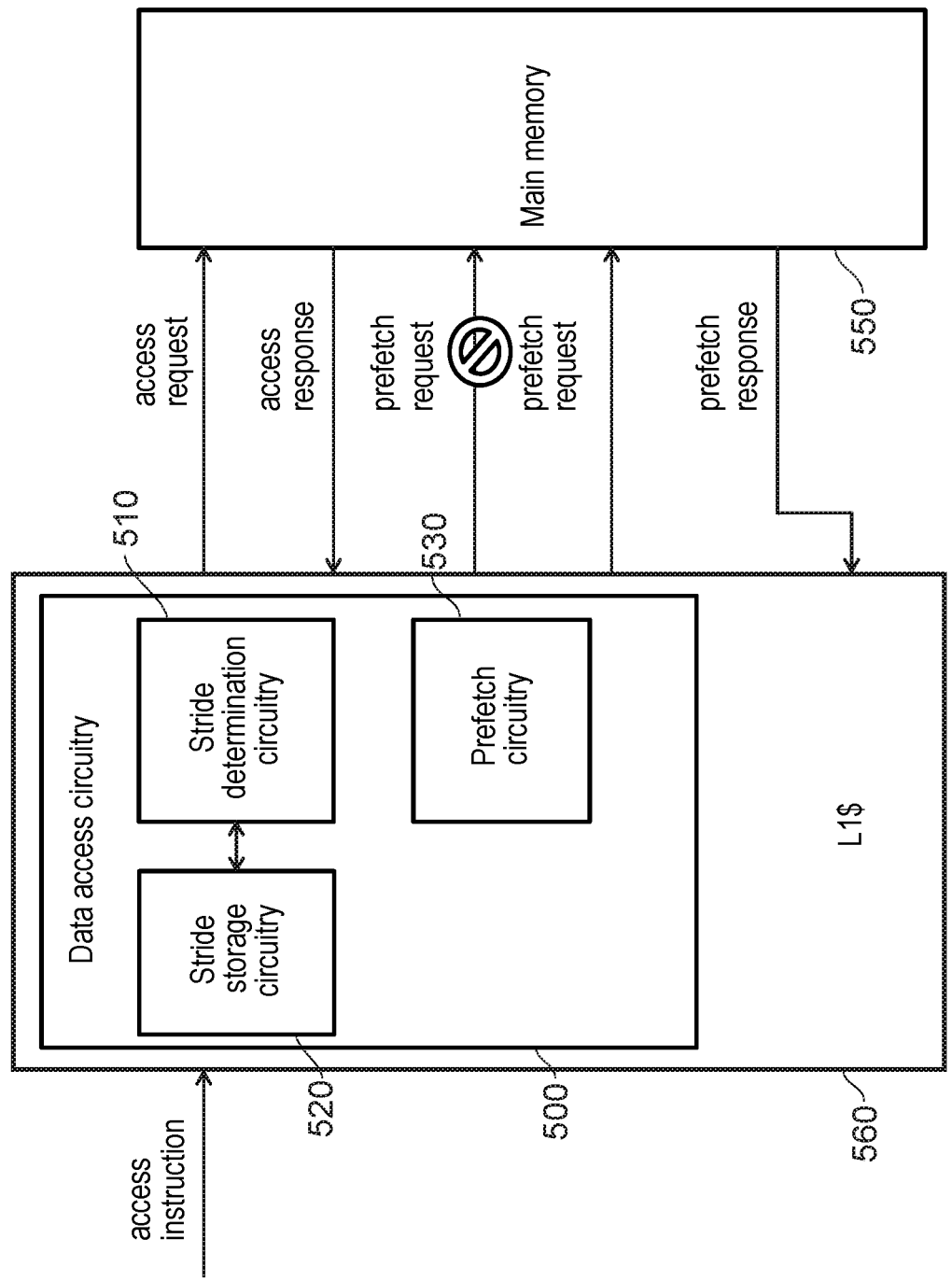
FIG. 5 schematically illustrates a data processing apparatus in accordance with some embodiments.

FIG. 5 illustrates a data processing apparatus 500 in the form of data access circuitry in accordance with some embodiments. In these embodiments, as before, stride determination circuitry 510 is used to calculate scores for a number of candidate stride values stored in stride storage circuitry 520. These scores are calculated during a training period and the winning such stride value is then used by prefetch circuitry 530 to issue prefetch requests. Such embodiments may include the ability to issue multiple prefetch requests in response to a single access instruction as illustrated with respect to FIG. 4 and/or the ability to cull certain candidate stride lengths from the stride storage circuitry as illustrated with respect to FIG. 1. In these embodiments, the prefetch circuitry 530 determines whether a prefetch request will be issued to the main memory 550 that causes a page boundary to be crossed between the prefetched address and the current address that is received as part of the access instruction at the data access circuitry 500. If such a page boundary would be crossed, then the prefetch circuitry 530 adjusts the list of possible candidates in the stride storage circuitry 520 and begins the selection process again. For example, the scores remain the same, but the list of candidates from which a stride value can be selected is restricted. A stride length is thereby selected that is unlikely to result in a page table being crossed. By avoiding prefetching across page boundaries, efficiency of the memory access process can be improved. This is because accessing data on different pages of the main memory 550 can be slower than accessing data in the same page. Furthermore, some implementations (e.g. that may lack access to a Translation Lookaside Buffer) do not have the capability of computing the Physical Address of a prefetch address if it crosses pages. Adding a TLB may, however, be undesirable due to power/space constraints.

Figure 6:
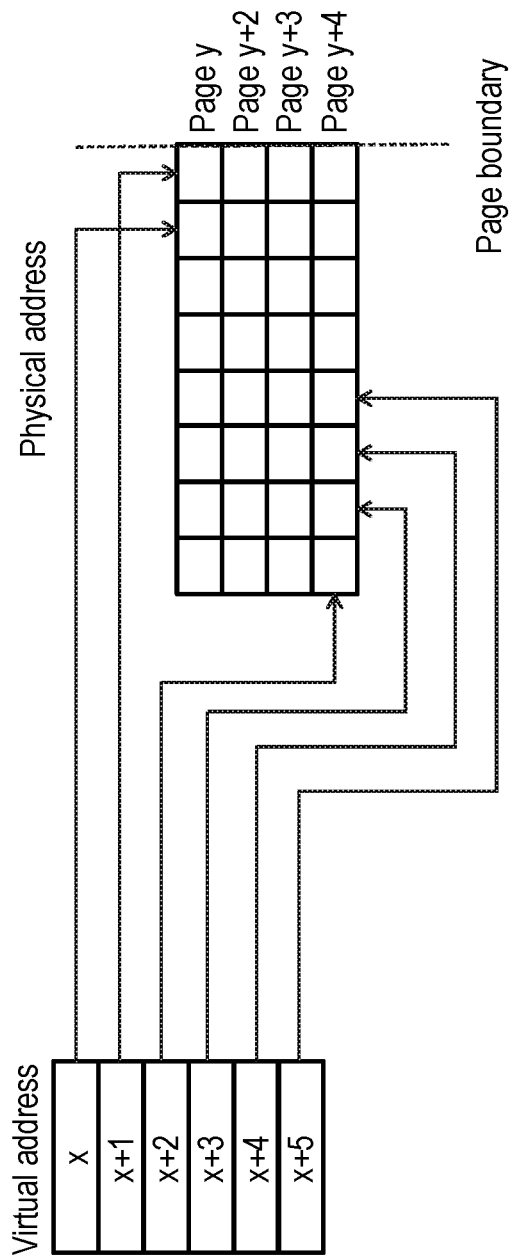
FIG. 6 shows the relationship between virtual addresses and page boundaries in memory.

FIG. 6 illustrates an example of the relationship between virtual addresses and physical addresses with respect to page boundaries. In particular, as shown in FIG. 6, a number of virtual addresses X, X+1, X+2, . . . are provided, each of which translate to a different physical address, which is an address in the physical memory. The memory is split into pages with a page boundary marking the address at which a page changes. As shown in FIG. 6, there may be no relationship between a virtual addresses which are contiguous and physical addresses, which may not be. For instance, although a virtual address X points to a physical address that is contiguous with an address pointed to by a virtual address X+1, the physical address pointed to by a virtual address X+2 is not contiguous with either of these locations in the physical memory. In particular, the virtual addresses X and X+1 point to physical addresses that are on a page Y, whilst a virtual address X+2 points to an address that is on a physical page Y+4. Consequently, performing prefetching in respect of a virtual address X+1 and a virtual address X+2 would cause a page boundary to be crossed. Since the physical addresses associated with these virtual addresses are located on different pages of the physical memory, the process of accessing the physical memory to retrieve data at these addresses would be more time consuming than, for instance, accessing the physical memory at a location pointed to by a virtual address X and a virtual address X+1, both of which are located on the same page (Y) of the physical memory. Consequently, by selecting a stride length that avoids page boundaries being crossed, the process of prefetching and memory accessing can be made more efficient. It is, however, desirable for a stride length to be selected that will still result in the appropriate data being prefetched.

Figure 7:
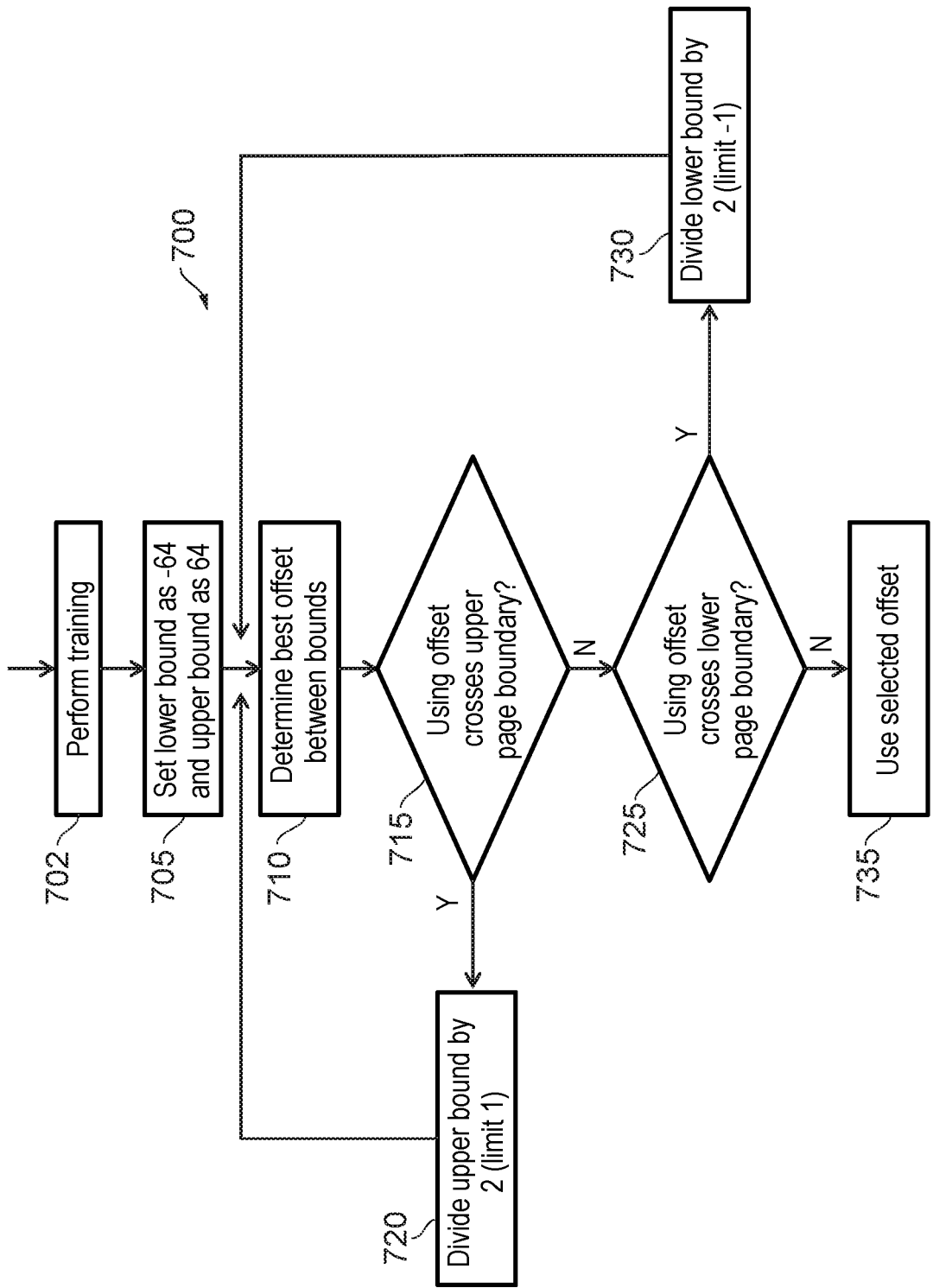
FIG. 7 shows, in flowchart form, a method for adjusting candidate stride lengths in accordance with some embodiments.

FIG. 7 illustrates a flow chart 700 that shows a method of adjusting the training process in order to select an appropriate offset that will avoid crossing page boundaries. In this example, the training occurs at a step 702. The initial lower and upper bounds are set in a step 705 as being −64 and +64, whose magnitude of 64 is a power of two. It will be appreciated that other bounds could be selected and the bounds need not be symmetrical. At a step 710, the best offset between the upper bound and the lower bound is determined using the training process that occurred in step 705 (e.g. as discussed with reference to FIG. 2). At a step 715, it is determined whether using the offset will cause an upper page boundary to be crossed. If so, then at step 720 the upper bound is divided by two (with a limit of 1). The process then returns to step 710. If the upper page boundary is not crossed at step 715, then at step 725 it is determined whether the lower page boundary is crossed. If so, then at step 730, the lower bound is divided by two (to a limit of −1). The process then returns to step 710. If at step 725 it is determined that the lower page boundary is not crossed either, then the selected offset is used at step 735 for further prefetching.

In this way, the limits of the offsets are divided by two until such time as a candidate is found that does not cross one of the page boundaries. The division by two recognises the fact that for a particular candidate, devisers of that candidate may contribute to the candidate score. Consequently, by dividing by two, it is possible for those devisers to reveal themselves and become eligible for selection. This can result in the selection of a candidate that may not perform as well as the initial candidate located between the boundary of −64 and +64, but nevertheless may still work well while avoiding crossing page boundaries. In this example, the two boundaries are symmetrical in that the midpoint is zero. However, it will be appreciated that in other embodiments, the midpoint could be a value other than zero. Such processes would require the calculation of the difference between the midpoint and the boundary to be divided by two if that boundary causes a candidate to be selected that will cross the page boundary. Note that this process does not necessitate rerunning the training period. Instead, the scores from the previous training period are kept and the best candidate is selected from a reduced set of possible candidates.

Figure 8:
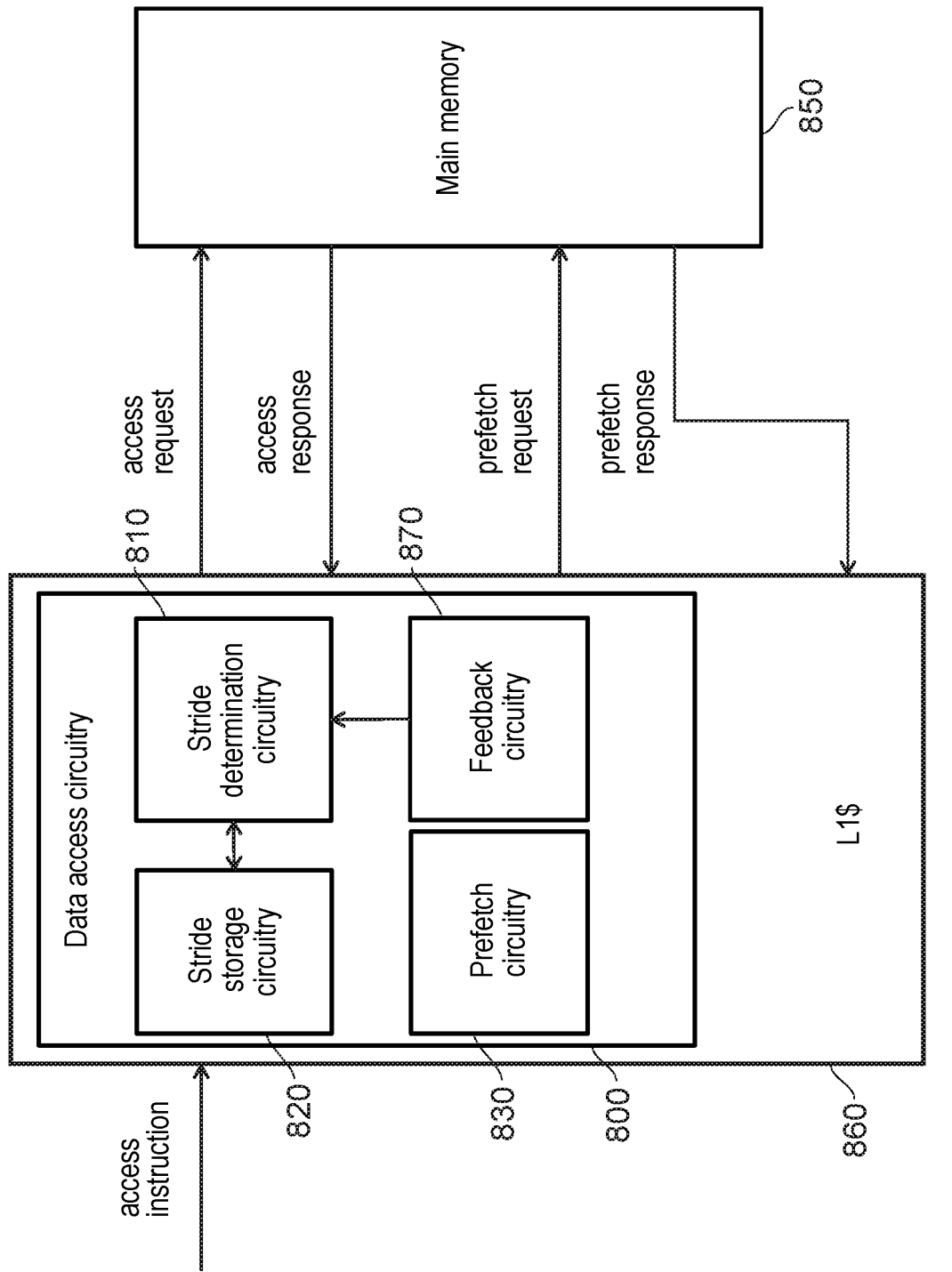
FIG. 8 schematically illustrates a data processing apparatus in accordance with some embodiments.

FIG. 8 illustrates data access circuitry 800 as an example of the claimed data processing apparatus in accordance with some embodiments. In these embodiments, the selection of a stride value by the stride determination circuitry 810 occurs approximately as previously described. However, once the training period has completed, feedback circuitry 870 is used in order to determine the quality of the selected stride value that is used by the prefetched circuitry 830 in order to perform prefetching. The feedback circuitry 870 uses its analysis of the performance of the selected stride value in order to control the parameters of the training process performed by the stride determination circuitry 810 when it is performed in the future. In particular, when it is determined that a particular stride value performs well, then it may be assumed that the stride value could have been selected earlier in the training process. Similarly, if the stride value performs poorly, then it is determined that the training period was not sufficiently long in order for the most appropriate stride value to make itself known. Accordingly, parameters that control the length of the training period can be altered based on the performance of the selected stride value. As in other embodiments, the data access circuitry 800 may be combined with the techniques illustrated and previously discussed with reference to, for instance, FIG. 5, FIG. 4 and FIG. 1.

Figure 9:
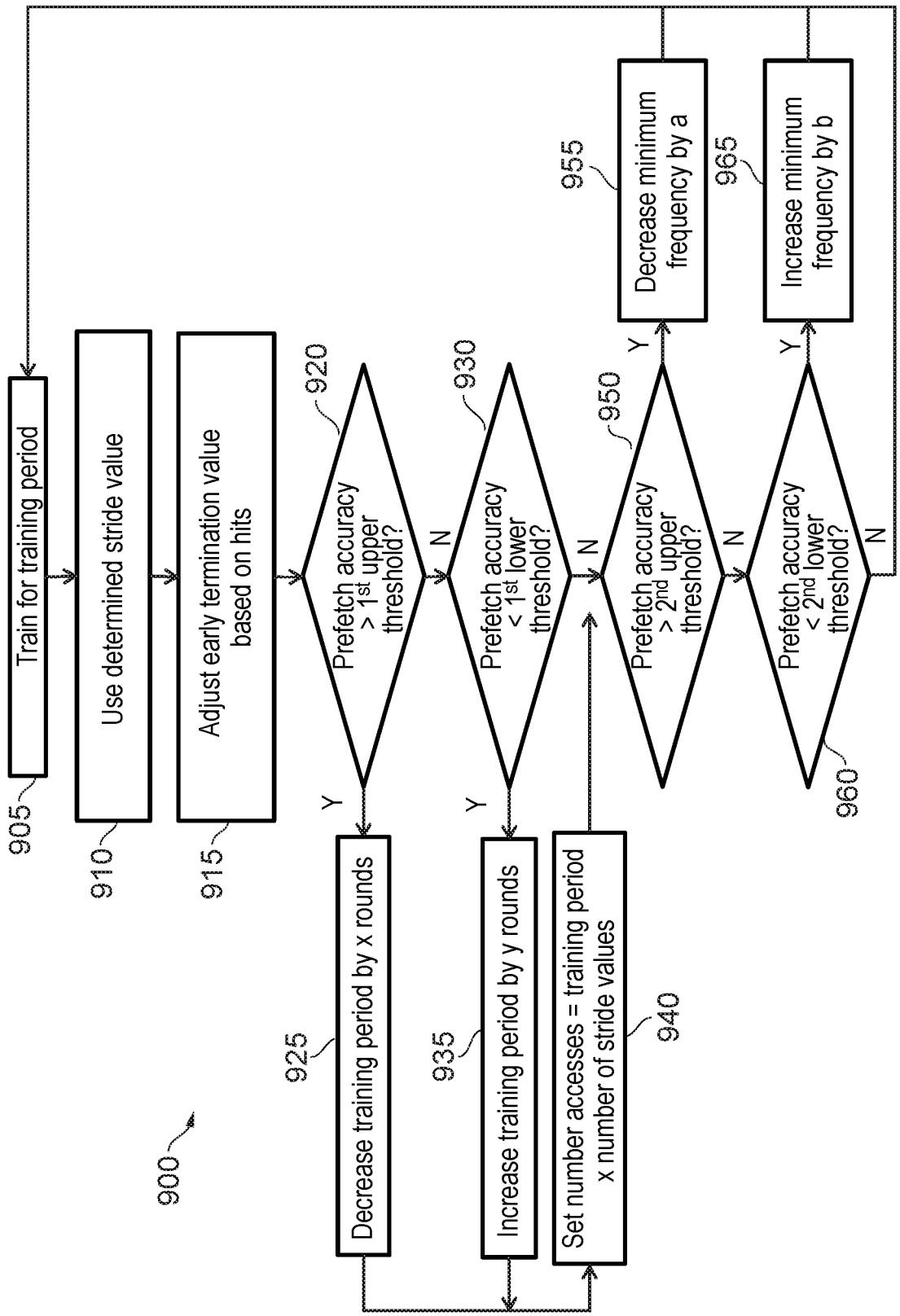
FIG. 9 shows, in flowchart form, a method for adjusting the training process in accordance with some embodiments.

FIG. 9 shows a flow chart 900 that illustrates a process of adjusting the parameters of the training process in accordance with some embodiments. At a step 905, the training period occurs as previously described. At a step 910, the stride value that is selected during the training period is then used for prefetching. At a step 915, the early termination value is adjusted based on the performance of the selected stride value in prefetching. For example, the performance could be based on a number of hits that occur over a number of accesses or a proportion of useful prefetches (e.g. those that are used) to total prefetches. As previously discussed, the early termination value is a value that causes the training process to end early if a score for one of the candidates meets the early termination value. The early termination value can be increased to attempt to choose a more accurate best offset and can be decreased in order to train more quickly. Having adjusted this value, at a step 920, it is determined whether the prefetch accuracy is above an upper threshold. If so, then the training period is reduced by a number of rounds instead of 925. The process proceeds to step 940. If the prefetch accuracy does not exceed an upper threshold at step 920, then at step 930, it is determined whether the prefetch accuracy is less than a first lower threshold. If so, then at step 935, the training period is increased by Y rounds. The process then proceeds to step 940 where a number of accesses that define the training period is made equal to the training period length in rounds multiplied by the number of candidate stride values. In any event, the process then proceeds to step 950 where it is determined whether the prefetch accuracy exceeds a second upper threshold. If so, then the minimum frequency is decreased by A. As previously discussed, the minimum frequency is the minimum score required by a candidate in order for that candidate to be used. The process then proceeds to step 905 where a further training period can take place in due course. If, at step 950 the second upper threshold is not met, then at step 960 it is determined whether the second lower threshold is met. If so, then at step 965, the minimum frequency is increased by B. In any event, the process then returns to step 905 where a further training period can take place in due course.

By increasing the training period, the likelihood with which a candidate can reveal itself as an appropriate candidate stride length is increased. Similarly, when the training period is decreased, the training process can be completed more quickly, which may still causes the candidate stride length to be revealed. By decreasing the minimum frequency, it is possible for more candidate stride lengths to be considered. By increasing the minimum frequency, it becomes less likely that a poor performing stride length will be selected. Although the values X, Y, A, and B have been indicated here thereby opening the possibility that each of these values could be different, there is no obligation for this to be so. In particular, in some embodiments X=Y and in some embodiments A=B.

There are a number of ways in which the early termination value can be adjusted. In some embodiments, a further set of thresholds are used in relation to the prefetch accuracy to determine how to adjust the early termination value. For instance, if the prefetch accuracy falls below a third lower threshold then the early termination value can be increased whereas if the prefetch accuracy exceeds a third upper threshold then the early termination value can be decreased.

Figure 10:
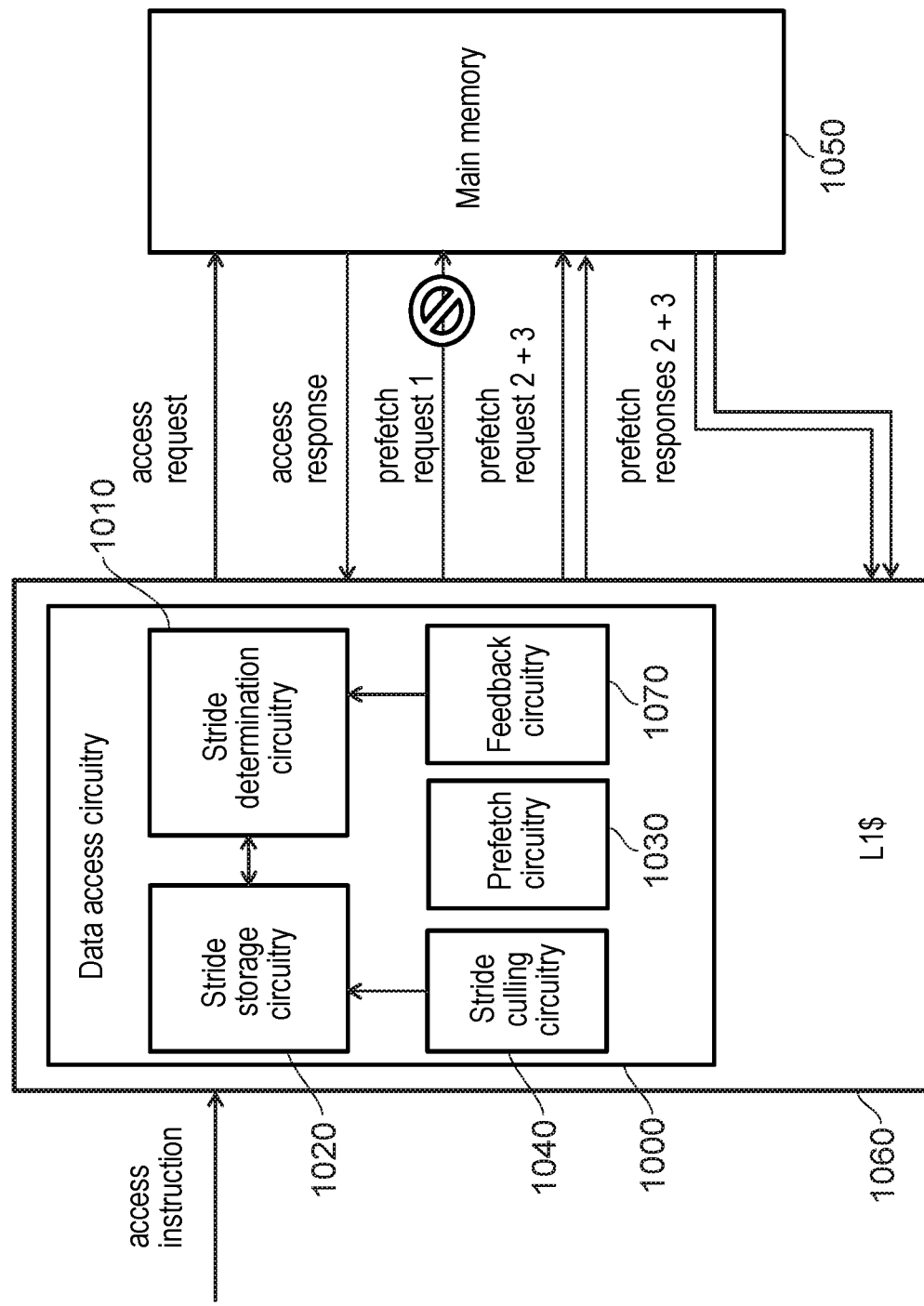
FIG. 10 schematically illustrates a data processing apparatus in accordance with some embodiments.

Although a number of different techniques have been described here, it is possible for all or some of these techniques to be combined into a single apparatus. For instance, as illustrated in FIG. 10 the data access circuitry 1000, which is an example of a data processing apparatus, includes the stride culling circuitry 1040 that is shown with respect to FIG. 1, the feedback circuitry 1070 that is illustrated with respect to FIG. 8, prefetch circuitry 1030 that is capable of issuing multiple prefetches, which is illustrated with respect to FIG. 4, and the avoidance of issuing prefetches that will cause page boundaries to be crossed as illustrated with respect to FIG. 5.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   data access circuitry to access data values in storage circuitry at addresses specified by access instructions;
   stride determination circuitry to determine a stride value as a difference between a current address and a previously received address;
   stride storage circuitry to store an association between stride values determined by the stride determination circuitry and a frequency of occurrence during a training period; and
   prefetch circuitry to cause a further data value to be proactively retrieved from a further address, wherein the further address is the current address modified by a stride value in the stride storage circuitry having a highest frequency during the training period such that the further address and the current address are on a same page of memory circuitry,
   wherein the stride values are bound by a lower stride value and an upper stride value; and
   when the further address and the current address are on different pages of the memory circuitry, the data processing apparatus is configured to reduce at least one of a magnitude of the lower stride value and a magnitude of the upper stride value, and then the data processing apparatus is configured to redetermine the stride value in the stride storage circuitry having the highest frequency during the training period.

2. The data processing apparatus according to claim 1, wherein
   both the magnitude of the lower stride value and the magnitude of the upper stride value are reduced.

3. The data processing apparatus according to claim 1, wherein
   when the further address and the current address are on different pages and when the further address is higher than the current address, the magnitude of the upper stride value is reduced; and
   when the further address and the current address are on different pages and when the further address is lower than the current address, the magnitude of the lower stride value is reduced.

4. The data processing apparatus according to claim 1, wherein
   the at least one of: a magnitude of the lower stride value and a magnitude of the upper stride value is reduced to either 0 or 1.

5. The data processing apparatus according to claim 1, wherein
   the at least one of: the magnitude of the lower stride value and the magnitude of the upper stride value is reduced by a half.

6. The data processing apparatus according to claim 1, wherein
   while the further address and the current address are on different pages of the memory circuitry, at least one the magnitude of the lower stride value and the magnitude of the upper stride value is reduced and then the stride value in the stride storage circuitry having the highest frequency during the training period is redetermined.

7. A data processing apparatus comprising:
data access circuitry to access data values in storage circuitry at addresses specified by access instructions;
stride determination circuitry to determine a stride value as a difference between a current address and a previously received address;
stride storage circuitry to store an association between stride values determined by the stride determination circuitry and a frequency of occurrence during a training period;
prefetch circuitry to cause a further data value to be proactively retrieved from a further address, wherein the further address is the current address modified by a stride value in the stride storage circuitry having a highest frequency above a minimum frequency during the training period; and
feedback circuitry to adjust at least one of: the training period, the minimum frequency, and an early termination value based on a performance of the stride value in the stride storage circuitry having the highest frequency above the minimum frequency during the training period,
wherein when the performance is below a lower threshold, the feedback circuitry is configured to increase the training period, and
wherein when the performance is above an upper threshold, the feedback circuitry is configured to decrease the training period.

8. The data processing apparatus according to claim 7, wherein
the performance is based on a number of hits that occur by using the stride value in the stride storage circuitry having the highest frequency above the minimum frequency during the training period.

9. The data processing apparatus according to claim 7, wherein
the training period is defined by a number of access instructions being received;
the number of access instructions is equal to a number of rounds multiplied by the number of stride values in the stride storage circuitry; and
the number of rounds is adjusted in dependence on the performance.

10. The data processing apparatus according to claim 7, wherein
the training period is defined by the highest frequency exceeding the early termination value.

11. The data processing apparatus according to claim 7, wherein
the minimum frequency is adjusted in dependence on the performance;
when the performance is below a lower threshold, the minimum frequency is increased; and
when the performance is above an upper threshold, the minimum frequency is decreased.

12. The data processing apparatus according to claim 7, wherein
the at least one of the training period and the minimum frequency is adjusted to one of a number of discrete values.

13. A method of operating a data processing apparatus comprising:
determining a stride value as a difference between a current address specified by access instructions and a previously received address;
storing an association between stride values and a frequency of occurrence during a training period
causing a further data value to be proactively retrieved from a further address, wherein the further address is the current address modified by a stored stride value having a highest frequency above a minimum frequency during the training period;
adjusting at least one of: the training period, the minimum frequency, and an early termination value based on a performance of the stored stride circuitry having the highest frequency above the minimum frequency during the training period,
wherein when the performance is below a lower threshold, the training period is increased, and
wherein when the performance is above an upper threshold, the training period is decreased.

* * * * *